United States Patent

[11] 3,562,534

[72] Inventors Jay H. Jarrett;
 Jerome L. Lorenz, Columbus, Ohio
[21] Appl. No 825,847
[22] Filed May 19, 1969
[45] Patented Feb. 9, 1971
[73] Assignee Ranco Incorporated
 Columbus, Ohio
 a corporation of Ohio

[54] PHOTOELECTRIC LEVEL CONTROL SYSTEM WITH LAMP OPERATED AT ALTERNATE BRIGHTNESS UTILIZING SEPARATE PHOTOCELL AND SCR
 2 Claims, 1 Drawing Fig.
[52] U.S. Cl. .................................................. 250/205,
 250/211, 250/214, 250/218; 307/311
[51] Int. Cl. ....................................................... G01j 1/32,
 H01j 39/12, H03k 3/42
[50] Field of Search .......................................... 250/218,
 211J, 205, 214; 307/311

[56] References Cited
UNITED STATES PATENTS
3,308,276 3/1967 Panagiotou et al. ........... 307/311X
3,322,959 5/1967 Lorenz .......................... 250/218
3,361,931 1/1968 Vollrath ........................ 307/311X
3,467,828 9/1969 Graf ............................. 250/214
3,473,084 10/1969 Dodge .......................... 307/311X

*Primary Examiner*—James W. Lawrence
*Assistant Examiner*—T. N. Grigsby
*Attorney*—Watts, Hoffmann, Fisher and Heinke ABSTRACT: An electric lamp projects a light beam on a level at which a body of material is to be maintained and onto a light sensitive resistance element. When the beam is unobstructed the element triggers an SCR which conducts and initiates depositing of material until the material obstructs the beam whereby the element deactivates the SCR to terminate depositing of material. The lamp is energized by a center tap transformer winding connected to the lamp filament so that the lamp is energized by a full wave AC rectified to DC when the SCR conducts and by one-half wave AC rectified when the SCR is nonconducting whereby the lamp intensity is high during depositing of material and low during the period the light is obstructed by material.

PATENTED FEB 9 1971
3,562,534
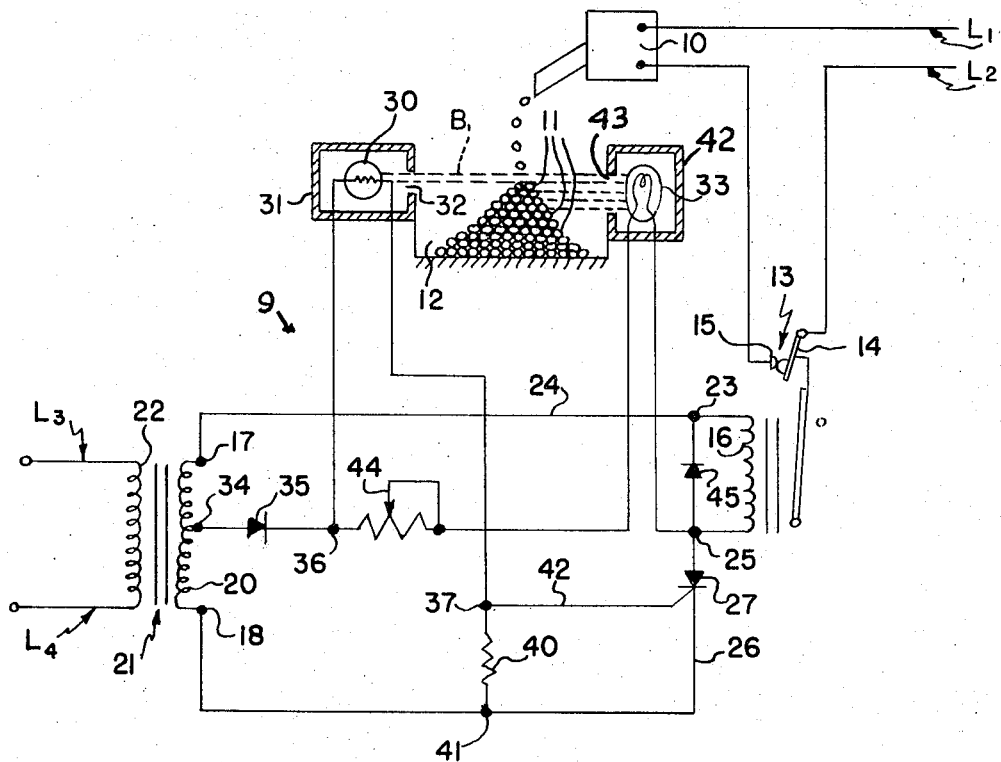
INVENTORS
JAY H. JARRETT
BY JEROME L. LORENZ
Watts, Hoffmann, Fisher & Heinke
ATTORNEYS

PHOTOELECTRIC LEVEL CONTROL SYSTEM WITH LAMP OPERATED AT ALTERNATE BRIGHTNESS UTILIZING SEPARATE PHOTOCELL AND SCR

BACKGROUND OF THE INVENTION

The present invention relates to an improved circuit for a photoelectric material level measuring apparatus in which a beam of light is projected along a level at which material is to be detected, the intensity of the light beam being relatively high during the time and material is below the indicated level and which light intensity is materially decreased when the beam is substantially obstructed by the presence of material at the indicated level. The invention is particularly suited for controlling operation of machines which deposit material in a storage area, such as an ice cube making machine, to maintain a desirable level of material. By changing the intensity of the light beam as described, flicker operation or short cycling of the machine is prevented because an appreciable decrease in level of the material in the path of the light beam must occur before the light sensitive resistance is affected to initiate operation of the machine by the low intensity beam and during depositing of material the high intensity beam provides sufficient light on the light sensitive element to maintain the machine operative until the level of material substantially blocks the light beam. The present invention relates to improvements in certain respects over the apparatus disclosed in U.S. No. 3,322,959.

THE INVENTION

A principal object of the present invention is the provision of a new and improved photoelectric material level measuring apparatus of the type mentioned which is comprised of a minimum number of inexpensive and reliable solid state circuit components.

More specifically, an object of the present invention is the provision of an improved photoelectric material level measuring apparatus comprising an electric load means which is energized by a circuit connected across the secondary of a transformer and including an SCR in series with the load means, the gate of the SCR being controlled by a light responsive resistance element which resistance varies according to the intensity of a light beam directed thereat along a level at which material is to be maintained, the light beam being furnished by an incandescent lamp adapted to be energized to maximum intensity by a full wave AC rectified to DC provided by two circuits each adapted to carry alternate one-half of the rectified AC, and one circuit including the SCR so that when the SCR is nonconducting the light is energized by only one-half an AC wave and its intensity is correspondingly reduced.

Other objects and advantages of the invention will be apparent from the following description of a preferred form thereof, reference being made to the accompanying schematic drawing of an ice cube machine and a circuit to control operation of the machine for maintaining a predetermined quantity of ice cubes in the storage bin of the machine.

Referring to the accompanying drawing, an apparatus 9 is shown for controlling the operation of an electrically powered ice cube making machine 10 which is operative to discharge ice cubes 11 into a storage bin 12. The machine 10 and bin 12 are conventional and for sake of clarity are shown schematically.

The operation of the machine 10 is controlled by an electromagnetic switch 13 having a movable contact 14 adapted to close on a contact 15 when a solenoid coil 16 is energized. The contact 14 is moved from contact 15 when the solenoid is deenergized. The motor for the machine 10 is powered by a conventional 120 V. Power supply furnished through lines L1, L2 and the switch 13 is in power line L2, as shown. The apparatus 9 is operative to close the switch 13 and initiate operation of the machine 10 when the level of the ice cubes falls to a minimum level and to terminate operation of the machine when the ice cube level reaches a desired maximum.

The solenoid 16 is energized by a circuit which includes the end terminals 17, 18 of the secondary winding 20 of a stepdown transformer 21. The primary winding 22 of the transformer is connected with a suitable power source, such as 120 v. AC power lines L3, L4, and the voltage between the terminals 17, 18 alternates at 24 v. A terminal 23 at one end of the solenoid 16 is connected to winding end terminal 17 by a conductor 24 and the other terminal 25 of the solenoid is connected with the winding end terminal 18 by a conductor 26 which includes an SCR 27. The SCR 27 is oriented to pass current from terminal 25 to terminal 18 when the gate thereof has a given voltage applied thereto; otherwise the SCR blocks the flow of current to or from terminal 25. When the terminal 17 is positive with respect to terminal 18 and the SCR is conducting, the solenoid 16 will be energized by half wave 24 v. DC and switch 13 will be closed to cause operation of the machine 10.

Voltage is applied to the gate of the SCR 27 through a light sensitive resistance element 30 which preferably comprises a cadmium cell and is located in a suitable housing 31 positioned at one side of the bin 12. The housing 31 has an opening 32 to receive the beam of a light projected by a lamp 33 located on the opposite side of the bin. One side of the resistance element 30 is connected with a center tap terminal 34 of the transformer winding 20 by a circuit including a diode 35 and a terminal 36. The other side of the element 30 is connected with the end terminal 18 of the transformer winding 20 by a circuit which includes a terminal 37, resistor 40, terminal 41 and conductor 26. The gate of SCR 27 is connected to terminal 37 by a conductor 42. It will be seen that when the voltage at terminal 17 is positive with respect to terminal 18, 12 v. DC is impressed between terminals 36 and 41, and the voltage at terminal 37 and the gate of the SCR will depend upon the resistance of element 30. This resistance varies in proportion to the intensity of the light striking the element.

Depending upon the intensity of the light striking the element 30, the voltage at terminal 37 may or may not be sufficient to trigger the gate of the SCR 27.

The lamp 33 is a 12 v. incandescent type and is mounted in a suitable housing 42 having an opening 43 through which light from the lamp is projected in a beam B across the bin 12 and through the opening 32 and onto the element 30. The level of the light beam B is located to correspond generally to the level of ice cubes to be maintained in the bin 12. Preferably, suitable lens, not shown, may be installed in the housing openings 32, 43 to provide a beam of light which is condensed or focused onto the element 30.

One side of the filament of the lamp 33 is connected with the center tap 34 of the transformer winding 20 through a circuit including diode 35 and a rheostat 44. The other side of the lamp filament is connected with the end terminals 17,18 of the secondary winding through two branch circuits so that each circuit provides one-half wave of a full wave AC rectified to DC. One branch circuit includes terminal 25, a diode 45, terminal 23 and conductor 24 to terminal 17. The diode 45 is oriented to pass current from terminal 25 to terminal 23. The other branch circuit for the filament of lamp 33 includes terminal 25, SCR 27, conductor 26 to winding end terminal 18. By the circuitry described, when the SCR 27 is nonconducting the lamp 33 will be energized by one-half wave of the full wave 12 v. AC output at the center tap when terminal 18 is positive relative to the terminal 17. This circuit is from terminal 34 through diode 35, rheostat 44, lamp 33, terminal 25, diode 45 and terminal 23 to terminal 17. The SCR 27 blocks current flow to the lamp filament from terminal 18. When terminal 17 becomes positive relative to terminal 18, the nonconduction of SCR 27 blocks current flow from terminal 25 to terminal 18 and therefore this half wave potential output of the transformer is blocked. Accordingly, the intensity of the lamp will be substantially below maximum. When the SCR 27 is conducting, however, the half wave circuit last described will be completed and the lamp will receive a full wave AC rectified to DC. This current produces maximum intensity of the lamp which is approximately twice the intensity as when energized by one.half waves.

The intensity of the lamp 33 can be adjusted by the rheostat 44 to obtain proper response of the element 30 to the lamp so that when the level of the ice cubes falls to a point where the light beam is nearly unobstructed thereby, the resistance of element 33 will decrease to a point which will trigger the SCR 27 into conduction. This initiates operation of the ice machine 10 to replenish the supply of ice cubes and also doubles the voltage to the lamp 33. The intensity of the light beam is increased which further raises the voltage on the gate of the SCR and thereby positively maintains the operation of the machine until the level of ice cubes in the bin rises to a point where the light beam is substantially entirely obstructed or diffused by the accumulation of ice cubes in the bin. This results in a drop in voltage at the gate of the SCR which renders the circuit for the solenoid 13 and one of the branch circuits for the lamp 33 nonconductive. As described previously, the intensity of the lamp is appreciably diminished with the result that the machine will not be operated again until the level of ice cubes has been reduced substantially below the level at which operation of the machine 10 was terminated so as to cause the element 30 to trigger the SCR.

By utilizing the element 30 to trigger the SCR, the element can be a relatively inexpensive and reliable light sensitive resistance material, such as a cadmium cell. By energizing the lamp by two one-half cycle responsive circuits, one of which includes the solenoid 16 and the SCR 27, an exceedingly simple and reliable circuitry is obtained.

We claim:

1. A material level sensing apparatus comprising: an electric load means; means to energize said load means comprising, a transformer having a center taped secondary winding, conductor means connecting one end of said winding with one terminal of said load means, conductor means connecting the other end of said winding with the other terminal of said load means; an SCR in one of said conductor means for controlling the flow of current therethrough; a light sensitive resistor having one terminal connected with the center tap of said winding; a circuit connecting the other terminal of said light sensitive resistor with one end of said winding, the last mentioned circuit including a resistance element, means connecting the gate of said SCR in said circuit between said resistance element and said light sensitive resistor; and electric lamp means adapted to project a beam of light across a space in which material is adapted to accumulate, one terminal of said lamp means connected with said center tap and the other terminal of said lamp means connected to the second mentioned means between said load means and said SCR; a shunt circuit between said SCR and the first mentioned conductor means and including a diode arranged to block the flow of current from the last mentioned conductor means to said SCR; and a diode in said center tap circuit for said light sensitive resistor and for said lamp means.

2. A material level sensing apparatus as defined in claim 1 further characterized by a rheostat being included in an energizing circuit for said lamp.